April 28, 1931. W. B. THIEMAN 1,802,588
TRUCK AND POWER ATTACHMENT FOR INTERNAL COMBUSTION ENGINES
Filed Oct. 25, 1927
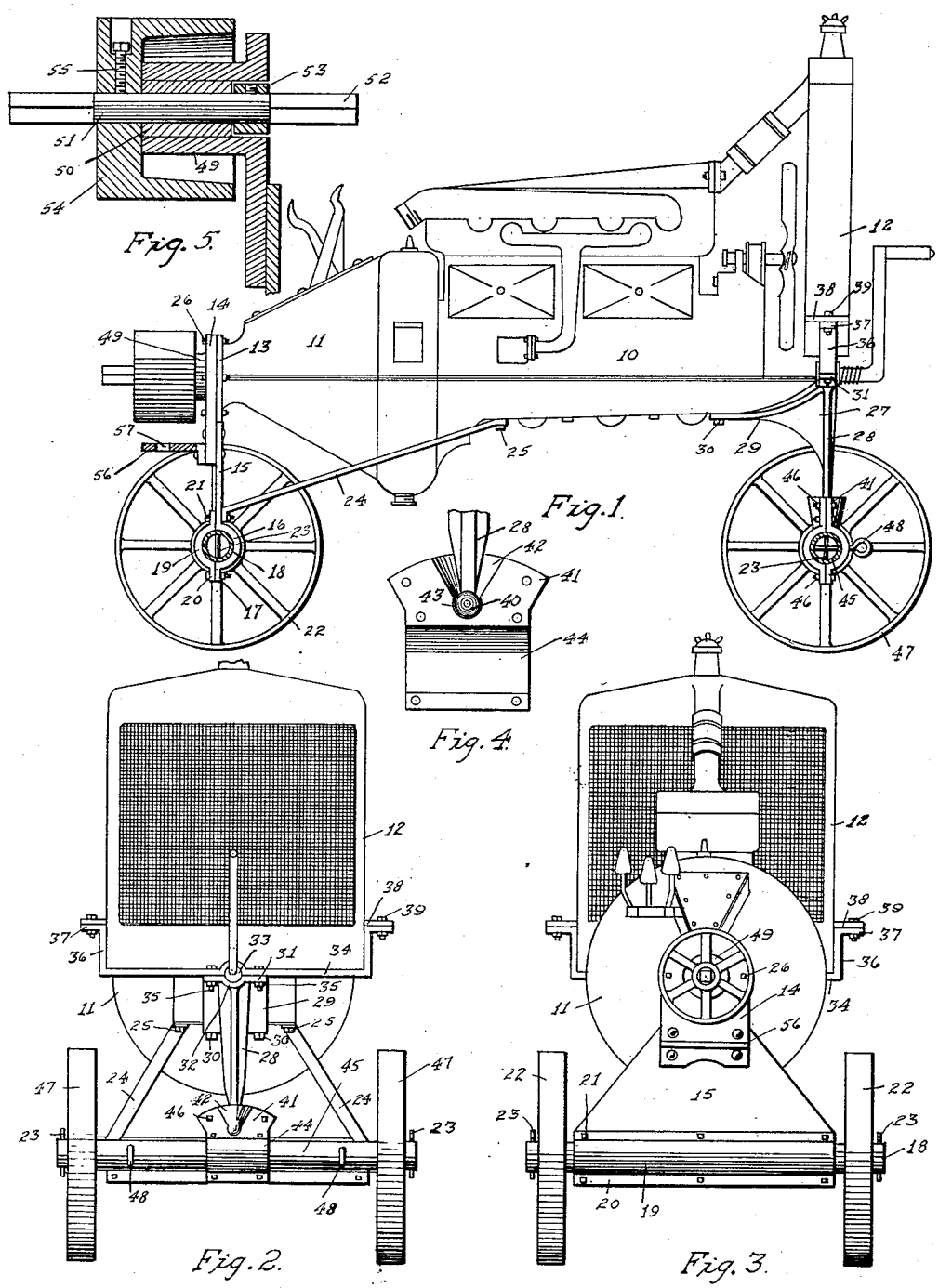

Patented Apr. 28, 1931

1,802,588

UNITED STATES PATENT OFFICE

WILLIAM B. THIEMAN, OF ALBERT CITY, IOWA

TRUCK AND POWER ATTACHMENT FOR INTERNAL-COMBUSTION ENGINES

Application filed October 25, 1927. Serial No. 228,591.

The object of my invention is to provide means whereby an internal combustion engine, designed for automobile purposes, may be utilized as a portable engine from which power may be derived for operating various kinds of farm machinery.

A further object is to provide a truck attachment of simple, durable and inexpensive construction, which may be easily and quickly applied to an automobile engine for the purpose of making the engine portable, and in connection therewith to provide means whereby the engine may be used for transmitting power to various farm machinery.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of an automobile engine showing the manner in which my truck attachment is connected thereto.

Figure 2 is a front elevation of the same.

Figure 3 is a rear elevation of Figure 1.

Figure 4 is a detail view showing one of the pivot plates for the front axle, and the manner in which the front bracket is pivotally connected therewith.

Figure 5 is a detail sectional view of the upper portion of the rear supporting bracket showing the power take-off mechanism.

The numeral 10 indicates an internal combustion engine of that type used in the propelling of automobiles, and having a gear casing 11 at its rear end, the forward end being provided with the usual radiator 12. The gear casing 11 is of that type having an annular flange 13 to which the universal housing is usually bolted, the universal housing being removed and the bearing plate 14 bolted in position. Said bearing plate is provided with a downwardly extending truck plate 15, the upper edge of which is riveted to said bearing plate. The lower edge of the truck plate 15 is pressed to form a horizontal groove 16, which is semi-cylindrical in formation and so located that a downwardly extending flange 17 is provided. The groove 16 is designed to receive a tubular axle 18 secured in position by means of a clamping plate 19, said plate having flanges 20 designed to receive bolts 21 for securing the plate adjacent to the plate 15 and the flange 17, in the manner clearly illustrated in Figures 1 and 3. Each end of the axle 18 is provided with a wheel 22 secured in position by means of pins 23. Braces 24 are provided, the rear ends of which are bolted to the plate 15, while their forwardly extending ends are bolted to the under side of the engine 10 by means of pan bolts 25. Thus it will be seen that the plates 14 and 15, together with the axle 16 and the wheels 22, form a truck member for supporting the rear end of the engine, said plate 14 being secured in position by bolts 26 mounted in the openings of the flange 13.

The forward end of the engine 10 is supported by means of a front bracket 27, comprising a vertically arranged post 28 and a rearwardly extending flange 29. The said flange 29 is bolted to the under side of the engine by pan bolts 30. The upper end of the post 28 is provided with laterally extending flanges 31 and a semi-cylindrical groove 32. The groove 32 is designed to receive the forward pivot member 33 of the engine. A radiator supporting bar 34 is mounted on the flanges 31, said bar being bent upwardly at its central portion to surround the pivot 33 and to provide means for clamping said pivot member within the groove 22. The bar 34 is secured in position by means of bolts 35. The bar 34 has upwardly extending members 36 which terminate in outwardly extending flanges 37 designed to receive the flanges 38 of the radiator 12. The flanges 38 are secured in position by means of bolts 39.

The lower end of the post 28 is provided with a ball 40 designed to be carried in a socket formed in two clamping plates 41, said plates being provided with segmental grooves 42 which terminate in sockets 43 at their lower ends for receiving the ball 40. The plates 41 are also provided with horizontal, semi-circular grooves 44 for receiving the front axle 45. The plates 41 are secured together by suitable bolts 46, said plates rigidly clamping the front axle 45 and providing means for supporting and retaining the ball 40. The groove 42 permits the plates 41 to rotate about the vertical axis of the post 28 and also to tilt sideways. The ends of the axle 45 are provided with wheels 47, while eye bolts 48 provide means whereby the tongue may be attached to the axle.

Thus it will be seen that the bracket 27, together with the axle 45 and the wheels 47, provides means for supporting the forward end of the engine, which may be conveniently moved to any desired position.

The rear plate 41 is provided with a hub 49 in which is mounted a bearing 50 designed to rotatively receive a shaft 51, each end of which is provided with a squared portion 52. One end of the shaft 51 is provided with a collar 53 for preventing outward movement of the shaft. The opposite end of said shaft 51 is provided with a belt pulley 54 secured in position by means of a set screw 55. The flange of the wheel 54 overlaps the bearing 49 to distribute the lateral strain of the shaft incurred by the stretch of the belt near the central portion of the bearing 50. The squared portion of the inner end of the shaft 51 is designed to be placed in the gear casing 11 and to connect with the gear mechanism therein in the same manner in which the stub shaft of the universal joint is applied. The outwardly extending portion of the shaft 51 is designed to receive coupling means whereby an extension shaft may be driven directly from the shaft 51. Said extension shaft is applied directly to the power shaft of the machine driven by the engine.

A rearwardly extending plate 56 is secured to the plate 14 and provided with an opening 57 for receiving a brace rod or other suitable means for supporting the rear end of the engine against lateral movement caused by the tension of the belt operating over the pulley 54.

Thus it will be seen that I have provided a truck attachment and power take-off device which may be easily and quickly applied to an internal combustion engine designed for automobile purposes, and is particularly adapted to be used with engines that have been removed from worn out automobiles, and when mounted on the engine, provides means whereby the engine may be easily and quickly moved from one position to another for operating various farm machinery.

I claim as my invention:

1. In combination, an internal combustion engine having a gear casing at one end, one end of said gear casing being provided with an annular flange, a bearing plate secured to said flange, said plate being provided with a rearwardly extending hub, a bearing in said hub, a shaft rotatively mounted in said bearing, one end of said shaft being designed to operatively connect with the gears of said gear casing, and a belt pulley for the opposite end of said shaft, the lower end of said bearing plate being provided with a rearwardly extending plate having an opening for receiving a brace rod, said opening being located substantially midway between the front and rear edges of said pulley.

2. In combination, an internal combustion engine, a truck for supporting the forward end of said engine, a truck for supporting the rear end of said engine, a bearing plate secured to the gear casing of said engine, a bearing for said plate, a stub shaft for said bearing, a belt wheel for said shaft, said shaft being designed to be operatively connected to the gears in said casing, a plate secured to one end of said bearing plate and extending rearwardly and spaced from said pulley, said plate being provided with an opening for receiving a brace rod for overcoming the tension of a belt operating on said pulley.

3. In a device of the class described a bearing plate having truck member formed integral therewith, a shaft rotatively mounted in said bearing plate, means for detachably connecting the plate to one end of the transmission mechanism of an engine with said shaft in operative relation with the power mechanism of said engine, a truck member for the opposite end of said engine, and means for detachably connecting and bracing the said truck member.

4. In a device of the class described a bearing plate adapted to fit one end of the gear casing of an internal combustion engine, a shaft rotatively mounted in said bearing plate, each end of said shaft having a coupling means, a pulley intermediate said ends, a truck axle secured to said bearing plate, and braces for said axle.

5. In a device of the class described a bearing plate adapted to fit one end of the gear casing of an internal combustion engine, a shaft rotatively mounted in said bearing plate, each end of said shaft having a coupling means, a pulley intermediate said ends, a truck axle secured to said bearing plate, braces for said axle, and the lower end of said bearing plate being provided with a laterally extending plate having an opening for receiving a brace rod.

6. In a device of the class described a bearing plate adapted to fit one end of the gear casing of an internal combustion engine, a shaft rotatively mounted in said bearing plate, a pulley intermediate the ends of said shaft, a truck axle secured to said bearing plate, and braces for said axle.

Des Moines, Iowa, February 17, 1927.

WILLIAM B. THIEMAN.